United States Patent [19]
Thompson

[11] Patent Number: 5,531,512
[45] Date of Patent: Jul. 2, 1996

[54] BRAKE SYSTEM FOR A MOTOR VEHICLE

[75] Inventor: Graham Thompson, Mannheim, Germany

[73] Assignee: Deere & Company, Moline, Ill.

[21] Appl. No.: 493,228

[22] Filed: Jun. 20, 1995

[30] Foreign Application Priority Data

Jun. 22, 1994 [DE] Germany ............................ 44 21 831.1

[51] Int. Cl.⁶ .......................... B60T 11/20; B60T 13/68; B60T 17/22; B62D 11/08
[52] U.S. Cl. ...................... 303/9.61; 188/16; 188/151 A; 188/354; 303/6.01; 303/15; 303/20
[58] Field of Search ........................ 188/354, 16, 151 A, 188/34, 3 R; 303/9.61, 6.01, 20, 7, 50, 52, 15, 84.1, 84.2, 13; 60/581; 180/6.2, 6.44

[56] References Cited

U.S. PATENT DOCUMENTS

| | | | |
|---|---|---|---|
| 2,346,175 | 4/1944 | Matson | 188/354 |
| 3,466,096 | 9/1969 | Cunningham | 188/354 X |
| 4,258,958 | 3/1981 | Bloxham | 188/354 X |
| 4,299,136 | 11/1981 | Türi et al. | 188/354 X |
| 4,407,547 | 10/1983 | Edwards | 303/9.61 |
| 4,475,773 | 10/1984 | Bartscher et al. | 188/354 |
| 4,716,980 | 1/1988 | Butler . | |
| 5,190,356 | 3/1993 | Knowler | 303/9.61 |
| 5,441,136 | 8/1995 | Greaves et al. . | |

FOREIGN PATENT DOCUMENTS

| | | |
|---|---|---|
| 0084687 | 8/1983 | European Pat. Off. . |
| 0275985 | 7/1988 | European Pat. Off. . |
| 0295396 | 12/1988 | European Pat. Off. . |
| 0254113 | 1/1991 | European Pat. Off. . |
| 940626 | 3/1956 | Germany ............................ 188/354 |
| 3625025 | 10/1987 | Germany . |
| 2052401 | 4/1992 | Germany . |
| 62-206128 | 2/1988 | Japan . |

OTHER PUBLICATIONS

Patent Abstracts of Japan, vol. 012, No. 061, 24 Feb. 1988.

Primary Examiner—Douglas C. Butler

[57] ABSTRACT

A brake system for a motor vehicle selectively brakes single or multiple wheels. The brake system includes a hydraulic master cylinder which is actuated by a brake pedal and which is connected by an electrically controlled valve arrangement to hydraulically operated brakes on both sides of the vehicle. The brake system also includes an electric switching device for controlling the valve arrangement in order to selectively connect the master cylinder with the brakes of both sides of the vehicle or with a brake on one side of the vehicle The electrical switching device includes a manually operated, spring centered rocker switch which can be switched from a central position into two deflected positions.

19 Claims, 2 Drawing Sheets

BRAKE SYSTEM FOR A MOTOR VEHICLE

BACKGROUND OF THE INVENTION

The invention relates to a brake system for a motor vehicle for braking individual or multiple wheels. Such brake systems typically include a hydraulic master cylinder which is actuated by a brake pedal and which is connected to hydraulically operated brakes on either side of the vehicle by means of an electrically operated valve arrangement. Furthermore, such a brake system typically includes an electrical switching device through which the valve arrangement can be controlled in order to selectively connect the master cylinder with the brakes of both vehicle sides, or either at least one brake of the right side of the vehicle, or at least one brake of the left side of the vehicle.

In order to make it easier to negotiate tight turns, it is known practice from published European patent Application 0 084 687, in particular on agricultural vehicles such as agricultural tractors, to provide two brake pedals which can be actuated independently of each other, and brake pedal having a separate master cylinder coupled thereto, for generating the necessary brake pressure for the left or the right service brakes during braking. If only one brake pedal is depressed, only the associated left or right vehicle wheels are braked, resulting in a smaller turning radii. For normal vehicle operation the two brake pedals are mechanically connected to each other by a locking device, so that even if only one brake pedal is actuated, the wheels on both sides of the vehicle are braked. Because of the connection of two brake pedals, the locking device and the two master cylinders, this known brake system requires relatively many costly components and is expensive. Furthermore, the operation of the locking device is awkward and time consuming. If the operator accidentally fails to lock the two pedals during operation on the street, operation of a single pedal can produce dangerous driving conditions.

A brake system including only one brake pedal and only one master cylinder has become known from published German Patent Application 2052401. The hydraulic connection between the master cylinder and the brakes of the left or the right wheels is controlled by an electromagnetically operated selector valve. The foot plate of the brake pedal can be pivoted from a central position to both sides about an axis in the longitudinal direction of the pedal lever. Electrical contacts are arranged on both sides of the foot plate that separate the brakes on the one side or the other side of the vehicle from the master cylinder by means of the selector valve in each case when the foot plate is pivoted. The operation of the brake pedal, however, requires some dexterity on the part of the operator. Furthermore, the possibility cannot be excluded that during a full application of the brake or in emergency braking, the brake pedal may be accidentally pivoted, so that only one side of the vehicle is braked, resulting in a dangerous situation.

SUMMARY OF THE INVENTION

Accordingly, an object of this invention is to provide a brake system of the aforementioned type through which the problems mentioned can be overcome.

A further object of the invention is to provide such a brake system which contains the fewest possible mechanical components.

Another object of the invention is to provide such a brake system which makes possible a reliable brake operation, which can be manually operated simply and ergonomically and which can be integrated easily into existing vehicle structures.

These and other objects are achieved by the present invention which requires only one brake pedal with one master cylinder which may, if necessary, be configured larger than a master cylinder used in a conventional brake system. Operation of the one brake pedal forces brake fluid through only one brake line to an electromagnetically operated valve arrangement, which distributes the pressure to the left and/or the right brakes. The valve arrangement is most appropriately designed in such a way that in its rest position, that is, in the absence of an electrical signal, the valve arrangement keeps open the connection between the master cylinder and the brakes, so that depressing the brake pedal will reliably apply all brakes and uniform braking of the vehicle is possible. Many vehicles contain a wheel on each side of the vehicle that can be brakes by the brake pedal. But, the invention is also applicable where several wheels on each side of the vehicle are to be braked by actuation of the brake pedal.

The valve arrangement is controlled by an electrical switching device that contains a manually operated, spring-centered rocker switch, that can be momentarily brought out of its central position against the force of a spring into two deflected positions. Each deflected position is associated with an electromagnetic valve in the valve arrangement that can be actuated in the deflected position, so that the brake fluid line to the brake on one side of the vehicle is blocked. Therefore, an actuation of the brake pedal results in an application of the brakes only on the other side of the vehicle. If the rocker switch is in its central position, then the brake lines to all service brakes are open and an actuation of the brake pedal results in an application of the service brakes of both sides of the vehicle and those of an attached trailer, if applicable.

The rocker switch permits the selection of a brake mode, in which an actuation of the brake pedal delivers brake fluid from the master cylinder to both brakes and to a trailer, if connected, as well as a steering mode, in which an electromagnetically operated valve in the valve arrangement interrupts the brake line to the brakes on one side of the vehicle and only the brakes on the other side of the vehicle can be operated.

In contrast to the previously common brake systems with two brake pedals, the brake system according to the invention provides a saving in the number of components required, since only one brake pedal, one master cylinder, one brake line and no brake pedal lock are required. Safety problems that appear when the operator forgets to apply the lock between the two brake pedals, are avoided. Since only one brake pedal is used, more space is available on the floor of the cab, so that access through the right door of the cab is improved. If the vehicle is coupled to a trailer whose brakes are operated by the brake system of the vehicle, then the brake system according to the invention can easily be designed in such a way that the trailer can be braked only in the brake mode but not in the steering mode. Furthermore, it is possible to arrange the rocker switch at an ergonomically favorable location in the vehicle cab. It can be mounted, for example, on the operator's console, located to the right of the operator's seat and which contains the operating devices for the control of the lifting shaft and the control of the attached implements. It may also be appropriate for ergonomic reasons to arrange the rocker switch on the operating lever of a control lever that may be used, for example, to control the vehicle drive gearbox, or in the region of the arm rest of the operator's seat. Future developments using a main steering control lever for the vehicle gearbox and with on-board computers or more complex systems can easily be equipped with the characteristics according to the invention.

According to a preferred further development of the invention, a brake pedal switch is provided which can be triggered by the brake pedal and which responds as soon as the brake pedal is depressed beyond a pre-set path length. The brake pedal switch controls an electrical switching device. If the brake pedal switch is actuated at a time that is simultaneous with the operation of the rocker switch, then the particular left or right brake remains ineffective regardless of any subsequent position of the rocker switch until the brake pedal is released. The steering mode, once it is engaged, is thereby maintained as long as the brake pedal is at least partially depressed, so that the brake pedal switch responds. As soon as the brake pedal is released and returns to its rest position, the steering mode is terminated and can be activated again only by a renewed actuation of the rocker switch as well as the brake pedal. Here the advantage is that the steering mode remains active after a brief actuation of the rocker switch, without requiring the hand of the operator to be tied to the rocker switch. The hand is free for other tasks, for example, for the operation of the power take-off shaft or attached implements.

According to a further advantageous embodiment of the invention at least one steering angle sensor, which responds, in particular, when a pre-set steering angle is exceeded, as well as a steering brake selector switch is provided. When the steering brake selector switch is activated the switching device connects only the brakes of one side of the vehicle automatically with the master cylinder, when a pre-set steering angle is exceeded. Thereby, the steering brake selector switch permits the automatic engagement of a steering mode which is activated to apply the brakes when a pre-set left or right steering angle is exceeded. The signals can be controlled by means of steering pressure sensors or by front wheel steering angle measurement. This embodiment also permits automatic operation in which the hand of the operator remains free.

Preferably, a velocity sensor is provided to control the switching device in such a way that when a pre-set vehicle velocity is exceeded the master cylinder is automatically connected to all brakes including the brakes of a trailer, if applicable, (brake mode). This safety characteristic gives the assurance that at higher vehicle velocities, in particular in over-the-road operation, the steering mode is always disengaged and the brakes on both sides of the vehicle are applied when the brake pedal is depressed.

Preferably, the valve arrangement opens a connection between the master cylinder and a line that supplies the brake system of an implement attached to the vehicle basically only with the rocker switch in its central position. If the rocker switch is in its central position, then an actuation of the brake pedal applies all vehicle service brakes as well as the brakes of the attached implement, whereas if the rocker switch is in a deflected position only the right or the left brake of the tractor can be applied, but not those of the trailer.

The brake system according to the invention makes possible electric control of the valve arrangement through which the brakes on both sides of the vehicle are automatically connected to the master cylinder in the case of an electric or mechanical malfunction of the components of the brake system, so that in case of any malfunction the brake mode is always in effect.

Preferably the rocker switch, when it is in one of its deflected positions, controls the valve arrangement in such a way that the hydraulic connection between the master cylinder and the brake associated with that deflected position on one side of the vehicle is interrupted so that this brake does not respond when the brake pedal is actuated, but only the brake on the other side of the vehicle is applied. However this response can automatically be made ineffective when a pre-set vehicle velocity is exceeded.

It is appropriate to associate each of the two deflected positions of the rocker switch with a brake relay with at least one switch contact located between a current source and the value arrangement. When a current is flowing in the brake relay, the switch connection is closed and connects the valve arrangement with the current source, so that a valve between the master cylinder and the associated brake on one side of the vehicle is closed and no brake can be applied here.

The switch contact of the brake relay is most appropriately included in a locking circuit of the brake relay between the current source and the brake relay connection on the side of the current source. The brake pedal is preferably connected to an electrical switch contact which responds upon an actuation of the pedal and interrupts the locking circuit. In order to assure an automatic engagement of the brake mode at higher vehicle velocities, it is advantageous to arrange an electrical switch contact in the locking circuit which is connected to a velocity sensor in order to open the locking circuit when a pre-set velocity is exceeded. In order to control the brake valve of a trailer, arranged between the master cylinder and a vehicle-mounted hydraulic connecting manifold that supplies the brake line of a trailer, it is appropriate that each brake relay contain a further switch contact for the trailer which controls the brake valve of the trailer.

According to an advantageous further development of the invention one pole of a steering angle main switch is connected to a current source. Between the other pole of the steering angle main switch and the electromagnetically controlled brake valves associated with each brake that are open when no current is flowing, a steering angle switch each is provided that can be actuated by at least one steering angle sensor, which closes when a pre-set steering angle is exceeded.

Preferably the brake system according to the invention contains a separate electrical feedback circuit that produces an optical or acoustic signal when only one brake is actuated or if an electrical or mechanical malfunction exists. This can indicate that the steering mode is engaged. The warning signal can also be produced by mechanical malfunction of the electromagnetic coil.

The integration of the electrical control of the brake system into the on-board electronic system that also serves other purposes allows for a reduction in manufacturing costs.

DETAILED DESCRIPTION

Figure 1:
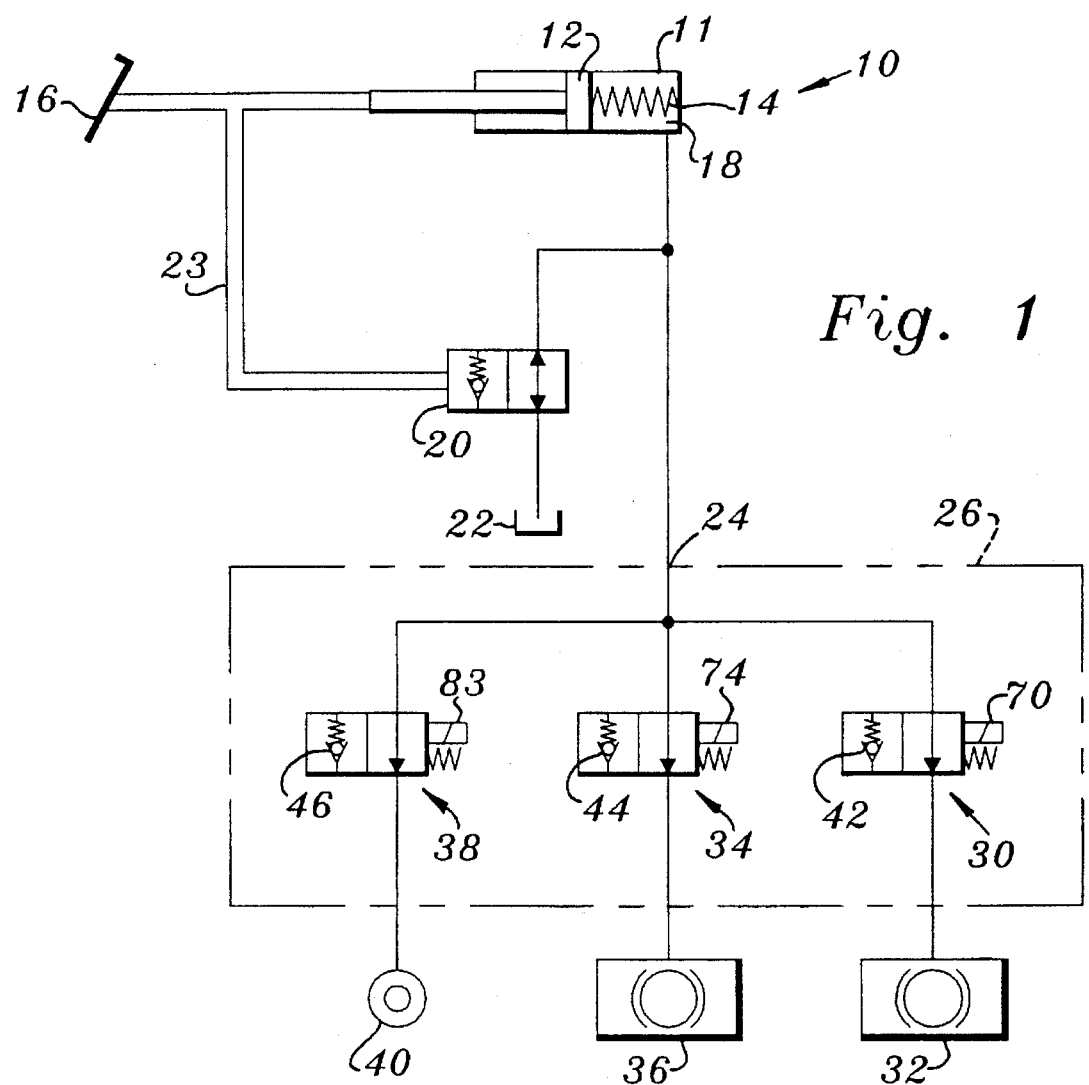
FIG. 1 is a hydraulic diagram of a brake system according to the invention.

The brake actuator 10 shown schematically in FIG. 1, includes a hydraulic master cylinder 11 with a piston 12 which can be moved by a brake pedal 16 against the force of a spring 14. The cylinder chamber 18 enclosed by the cylinder 11 is connected to a container 22 for brake fluid through a control valve 20. The control valve 20 is coupled to the brake pedal 16 by a mechanical connection 23. The valve 20 is open when no pressure is exerted upon the brake pedal 16 and the piston 12 is withdrawn to the greatest degree possible from the master cylinder 11 by to the force of the spring 14. When the brake pedal 16 is actuated the control valve 20 closes and pressure in the cylinder chamber 18 is built up which is transmitted to the inlet connection 24 of a valve housing 26.

The: valve housing 26 includes a valve arrangement with three electromagnetically operated 2-way, 2-position selector valves 30, 34 and 38 which are open when there is no current flow. Right brake valve 30 is connected to a right service brake 32 of the vehicle, not described in any further detail, left brake valve 34 is connected to a left service brake 36 of the vehicle, and a trailer brake valve 38 is connected to a hydraulic connecting manifold 40 to which a brake line of a trailer (not shown) which can be coupled to the vehicle, can be connected.

The selector valves 30, 34 and 38 are shown in FIG. 1 in their rest position with no current flow and are open. In this position both service brakes 32 and 36 and the hydraulic connecting manifold 40 are connected directly to the cylinder chamber 18 of the brake actuator 10, so that when the brake pedal 16 is depressed the two service brakes 32 and 36 as well as the brakes of a trailer, if connected, will respond. In case of an interruption of the current flow, the brake system reverts to its safety position, in which the selector valves 30, 34, 38 are open and an application of all brakes by the brake actuator 10 is possible.

In case a current source 50 is connected to the electromagnetic coils 70, 74, 83 of one of the selector valves 30, 34, 38, these are switched to the position not shown in which the passage is closed by check valves 42, 44, 46. The check valves 42, 44, 46 permit pressure equalization from the service brake 32, 36 or the hydraulic connecting manifold 40 to the brake actuator 10, but not in the opposite direction. In the energized position of the selector valve 30, 34, 38 an actuation of the associated service brake 32, 36 or the trailer brake, if connected, by the brake actuator 10 is not possible. The selective blocking of one of the brake valves 32, 36 makes possible the application of the service brakes 32, 36 on one side of the vehicle, which makes the steering in the direction of this side easier and results in a smaller turning radius.

Figure 2:
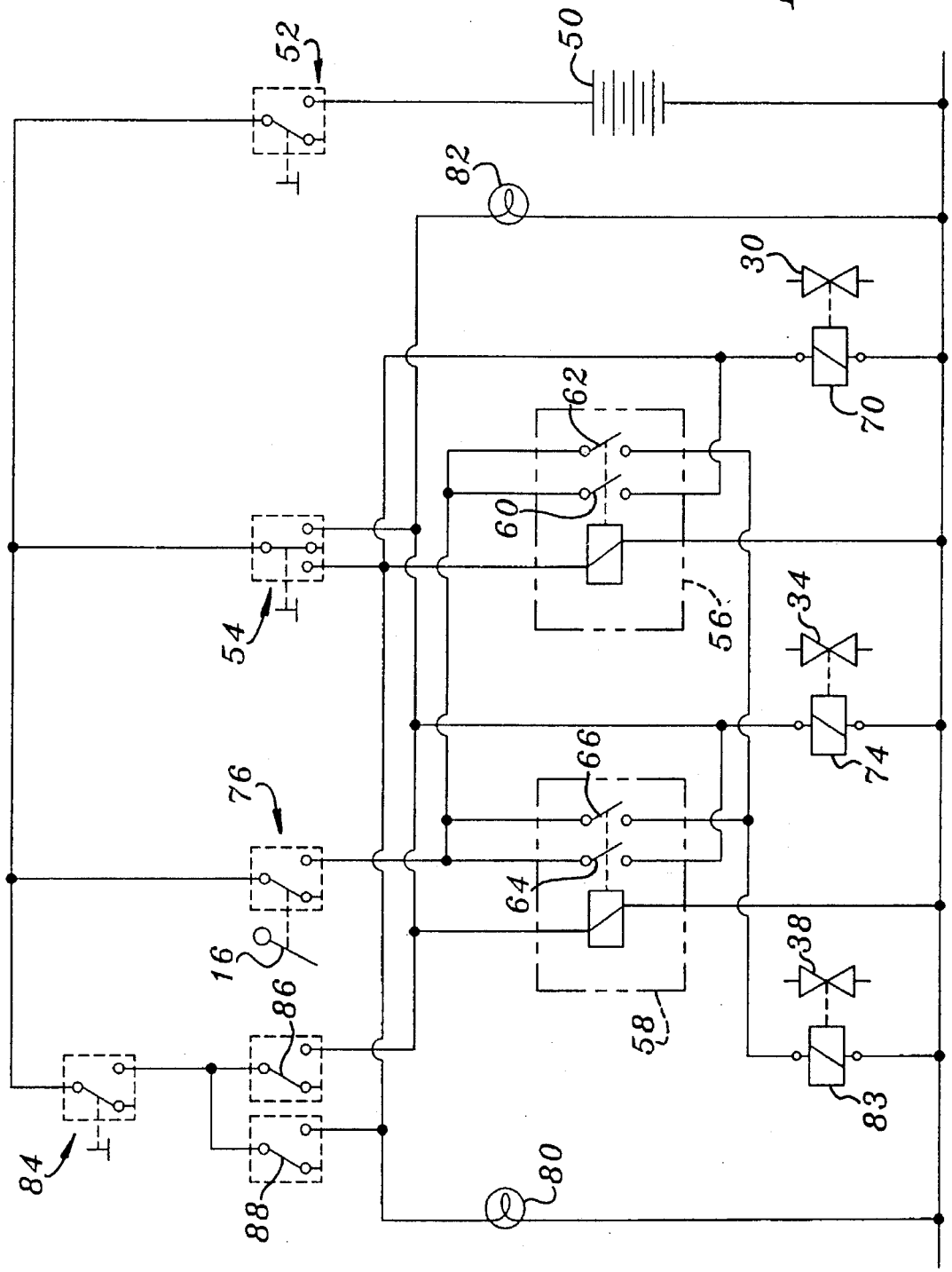
FIG. 2 is an electrical circuit for the control of the electromagnetic valves shown in FIG. 1.

Control of the electromagnetic coils 70, 74, 83 of the selector valves 30, 34, 38 is performed by an electrical switch arrangement which is shown in FIG. 2. The electrical switch arrangement is supplied with current by the vehicle battery 50. The vehicle battery 50 is connected in series with a vehicle velocity switch 52 which is controlled by a vehicle velocity sensor (not shown) in such a way that the vehicle velocity switch 52 opens when a pre-set vehicle velocity is exceeded and separates the remaining switching arrangement from the vehicle battery. Thereby, the selector valves 30, 34, 38 have no current flow at high vehicle velocities and all brakes are effective.

A manually operated rocker switch 54 has three switch positions. The rocker switch 54 is open when it is pre-loaded into its central rest position by the force of a spring, not shown. The rocker switch 54 can be momentarily switched manually into either of two deflected positions in which it selectively connects a right brake relay 56 or a left brake relay 58 with the vehicle battery 50. Thereby, the particular brake relay 56, 58 is energized and closes its two switch contacts 60, 62, 64, 66.

The first switch contact 60 of the right brake relay 56 is connected to the electromagnetic coil 70 of the first brake valve 30 and the first switch connection 64 of the left brake relay 58 is connected to the electromagnetic coil 74 of the left brake valve 34. Furthermore, both first switch contacts 60, 64 are connected together with a brake pedal switch 76, which can be moved from its open to its closed position by depressing the brake pedal 16. Thereby, the right brake valve 30 is actuated and closed only when the vehicle velocity is not too high (vehicle velocity switch 52 closed), when the brake pedal 16 is at least partly depressed (brake pedal switch 76 closed) and the rocker switch 54 is brought into its left position, so that the right brake relay 56 is energized and closes its first switch contact 60. Furthermore, in the left position of the rocker switch 54, a left signal light 80 is switched into the circuit, which is illuminated to show that the service brake 32 on the right side of the vehicle remains inoperable so that steering into a curve to the left is supported. A corresponding sequence applies to the switching and closing of the left brake valve 34 by deflecting the rocker switch 54 to the right as well as an indication by the right signal light 82.

Each of the first contact 60, 64 further serves for locking the corresponding brake relay 56, 58. When the contact is closed it connects the output line of the brake pedal switch 76 with the input side of the corresponding one of brake relays 56, 58. If, with closed brake pedal switch 76 and closed rocker switch 54, the brake relay 56, 58 is energized and the first contact 60, 64 is closed, then the rocker switch 54 can return to its central position without de-energizing the brake relay 56, 58. Then the contacts 60, 62 or 64, 66 of the corresponding brake relay 56, 58 do not open until the brake pedal 16 is released and the brake pedal switch 76 is opened. These components thus form a self-holding or locking circuit because once the relay has been enegized, the contact 60 or 64 closes a circuit to provide the relay 56 or 58 with power as long as the power supply is not interrupted by opening the switch 76 (and switch 52).

Through each of the second switch contacts 62, 66 of the brake relays 56, 58 the output of the brake pedal switch 76 can be connected with the electromagnetic coil 83 of the trailer brake valve 38. As a result, at any time that one of the brake relays 56, 58 is energized and closes the second switch contact 62, 66, the trailer brake valve 38 is closed and the trailer brakes are not exposed to the brake pressure. Thereby, the trailer is not braked when brakes are applied for cornering.

In addition to an actuation of the rocker switch 54, braking for cornering can also be engaged by steering angle sensors. For this purpose a manually operated steering angle main switch 84 is provided, through which the operator can select whether an automatic braking for cornering should occur when pre-set steering angles are exceeded. The steering angle main switch 84 is connected to a right steering angle sensor switch 86 and a left steering angle sensor switch 88. The right or the left steering angle sensor switch 86, 88 is closed when the right or the left steering angle exceeds preset values. The right steering angle sensor switch 86 is connected directly to the electromagnetic coil 74 of the left brake valve 34 and the left steering angle sensor switch 88 is connected directly to the electromagnetic coil 70 of the left brake valve 30. At low vehicle velocities (vehicle velocity switch 52 closed) as well as with the steering angle main switch 84 closed and sufficient steering angle to the right (steering angle sensor switch 86 closed), the left brake valve 34 is closed and the left service brake 36 is inoperative. Simultaneously, the right signal light 82 is illuminated. With a sufficient steering angle to the left, the right service brake 32 becomes correspondingly inoperative and the left signal light 80 is illuminated.

Furthermore, the output of the right steering angle sensor switch 86 is connected to the left brake relay 58 and the output of the left steering angle sensor switch 88 is connected to the right brake relay 56. Thereby, when braking for cornering dependent upon the steering angle, the corresponding brake relay 56, 58 is energized, closing the associated one of second switch contacts 62, 66, closing the trailer brake valve 38 and thereby separating the hydraulic connecting manifold 40 from the supply of brake pressure. As a result, the trailer will not be braked during braking for cornering dependent upon steering angle.

While the present invention has been described in conjunction with a specific embodiment, it is understood that many alternatives, modifications and variations will be apparent to those skilled in the art in light of the foregoing description. In such a way, for example, a monitoring circuit independent of the brake relays may be provided, which makes possible an optical monitoring of the mechanical position of the electromagnetic coils. If an electromagnetic coil is shifted in order to close the associated brake valve, then a corresponding indicator light is illuminated that may be located on the operator's console of the vehicle. This makes possible monitoring for mechanical malfunctions. If in addition a pre-set vehicle velocity is exceeded at the same time, an additional warning signal can pinpoint the particular location of the danger. Accordingly, this invention is intended to embrace all such alternatives, modifications and variations which fall within the spirit and scope of the appended claims.

I claim:

1. A brake system for a motor vehicle for selectively braking single or multiple wheels, the brake system having a hydraulic master cylinder which is actuated by a brake pedal and which is connected by an electrically controlled valve arrangement to hydraulically operated brakes on both sides of the vehicle, and the brake system also having an electric switching device for controlling the valve arrangement in order to selectively connect the master cylinder with the brakes of both sides of the vehicle or with a brake on one side of the vehicles, characterized by:

an electrical switch contact connected with the brake pedal; and the electrical switching device including a manually operated, spring centered rocker switch which can be switched from a central position into two deflected positions, and the switching device including a locking circuit which establishes the connections between the master cylinder and the brakes on both sides of the vehicle after an end of an actuation of the rocker switch as soon as the brake pedal is moved beyond a pre-set contact point of the switch contact.

2. The brake system of claim 1, further comprising:

a steering angle sensor and a steering brake selector switch, when the steering brake selector switch is activated, the switching arrangement automatically interrupting the connection between the master cylinder and the brakes on one side of the vehicle when a pre-set steering angle is exceeded.

3. The brake system of claim 1, characterized by:

a velocity sensor and the switching device automatically connecting the brakes on both sides of the vehicle with the master cylinder when a pre-set vehicle velocity is exceeded.

4. The brake system of claim 1, characterized by:

a line for supplying fluid pressure to an implement brake system of an implement which can be attached to the vehicle; and the valve arrangement providing an open connection between the master cylinder and the line only when the rocker switch is in its central position.

5. The brake system of claim 1, characterized by:

the valve arrangement including means for automatically connecting the brakes on both sides of the vehicle to the master cylinder in response to an electrical or mechanical malfunction of the brake system.

6. The brake system of claim 1, characterized by:

in each of its deflected positions the rocker switch interrupting a hydraulic connection between the master cylinder and the brake associated with an associated one of the deflected positions.

7. The brake system of claim 1, characterized by:

a brake relay with a brake relay switch contact associated with a deflected position of the rocker switch; and the rocker switch and the brake relay switch contact being located between a current source and the valve arrangement.

8. The brake system of claim 7, characterized by:

energization of the brake relay causes closing of the brake relay switch contact and connects the valve arrangement with the current source and interrupts a hydraulic connection between the master cylinder and an associated brake.

9. The brake system of claim 7, characterized by:

the brake relay switch contact forms part of a locking circuit between the current source and a connection of the brake relay on the side of the current source, wherein once the brake relay has been enegized, the brake relay switch contact closes a circuit to provide the brake relay with the current source as long as the current source is nototherwise disconnected from the brake relay.

10. The brake system of claim 7, wherein:

each brake relay includes a further trailer switch which controls a trailer brake valve.

11. The brake system of claim 1, characterized by:

a pair of electromagnetically operated brake valves, each brake valve being associated with a corresponding one of the brakes on one side of the vehicle, the brake valves being open when there is no current flowing therethrough;

an operator controlled steering angle main switch having a first pole connected to a current source and having a second pole; and a pair of steering angle sensor switches, each steering angle sensor switch closing when a pre-set steering angle is exceeded, each steering angle sensor switch being connected between the second pole a corresponding one of the brake valves.

12. The brake system of claim 1, characterized by:

means for generating an operator-detectable signal if not all the brakes can be actuated.

13. A brake system for a motor vehicle for selectively braking single or multiple wheels, the brake system having a hydraulic master cylinder which is actuated by a brake pedal and which is connected by an electrically controlled valve arrangement to hydraulically operated brakes on both sides of the vehicle, and the brake system also having an electric switching device for controlling the valve arrangement in order to selectively connect the master cylinder with the brakes of both sides of the vehicle or with a brake on one side of the vehicle, characterized by:

the electrical switching device including a manually operated, spring centered rocker switch which can be switched from a central position into two deflected positions; and a steering angle sensor and a steering brake selector switch, when the steering brake selector switch is activated, the switching arrangement automatically interrupting the connection between the master cylinder and the brakes on one side of the vehicle when a pre-set steering angle is exceeded.

14. A brake system for a motor vehicle for selectively braking single or multiple wheels, the brake system having a hydraulic master cylinder which is actuated by a brake pedal and which is connected by an electrically controlled valve arrangement to hydraulically operated brakes on both sides of the vehicle, and the brake system also having an electric switching device for controlling the valve arrangement in order to selectively connect the master cylinder with the brakes of both sides of the vehicle or with a brake on one side of the vehicle, characterized by:

a velocity sensor for sensing vehicle velocity;

the electrical switching device including a manually operated, spring centered rocker switch which can be switched from a central position into two deflected positions; and the velocity sensor and the switching device automatically connecting the brakes on both sides of the vehicle with the master cylinder when a pre-set vehicle velocity is exceeded.

15. A brake system for a motor vehicle for selectively braking single or multiple wheels, the brake system having a hydraulic master cylinder which is actuated by a brake pedal and which is connected by an electrically controlled valve arrangement to hydraulically operated brakes on both sides of the vehicle, and the brake system also having an electric switching device for controlling the valve arrangement in order to selectively connect the master cylinder with the brakes of both sides of the vehicle or with a brake on one side of the vehicle, characterized by:

a brake relay with a brake relay switch contact associated with a deflected position of the rocker switch;

the electrical switching device including a manually operated, spring centered rocker switch which can be switched from a central position into two deflected positions, the rocker switch and the brake relay switch contact being located between a current source and the valve arrangement; and the brake relay switch contact forming part of a locking circuit between the current source and a connection of the brake relay on the side of the current source, wherein once the brake relay has been energized, the brake relay switch contact closes a circuit to connect the brake relay with the current source as long as the current source is not otherwise disconnected from the brake relay.

16. The brake system of claim 15, characterized by:

a brake pedal switch which disconnects the current source from the brake relay and from the locking circuit upon actuation of the brake pedal.

17. The brake system of claim 15, wherein:

the locking circuit also includes an velocity switch which is connected to a velocity sensor and which opens when a pre-set velocity is exceeded.

18. A brake system for a motor vehicle for selectively braking single or multiple wheels, the brake system having a hydraulic master cylinder which is actuated by a brake pedal and which is connected by an electrically controlled valve arrangement to hydraulically operated brakes on both sides of the vehicle, and the brake system also having an electric switching device for controlling the valve arrangement in order to selectively connect the master cylinder with the brakes of both sides of the vehicle or with a brake on one side of the vehicle, characterized by:

a brake relay with a brake relay switch contact associated with a deflected position of the rocker switch;

the electrical switching device including a manually operated, spring centered rocker switch which can be switched from a central position into two deflected positions, the rocker switch and the brake relay switch contact being located between a current source and the valve arrangement; and each brake relay includes a further trailer switch which controls a trailer brake valve.

19. A brake system for a motor vehicle for selectively braking single or multiple wheels, the brake system having a hydraulic master cylinder which is actuated by a brake pedal and which is connected by an electrically controlled valve arrangement to hydraulically operated brakes on both sides of the vehicle, and the brake system also having an electric switching device for controlling the valve arrangement in order to selectively connect the master cylinder with the brakes of both sides of the vehicle or with a brake on one side of the vehicle, characterized by:

the electrical switching device including a manually operated, spring centered rocker switch which can be switched from a central position into two deflected positions;

a pair of electromagnetically operated brake valves, each brake valve being associated with a corresponding one of the brakes on one side of the vehicle, the brake valves being open when there is no current flowing therethrough;

an operator controlled steering angle main switch having a first pole connected to a current source and having a second pole; and a pair of steering angle sensor switches, each steering angle sensor switch closing when a pre-set steering angle is exceeded, each steering angle sensor switch being connected between the second pole a corresponding one of the brake valves.

* * * * *